United States Patent
Peng

(10) Patent No.: US 8,050,508 B2
(45) Date of Patent: Nov. 1, 2011

(54) DETECTING METHOD AND SYSTEM OF COMPRESSION-RELATED NOISE LEVELS

(75) Inventor: Yuan-Chih Peng, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 834 days.

(21) Appl. No.: 12/153,467

(22) Filed: May 20, 2008

(65) Prior Publication Data

US 2008/0292275 A1    Nov. 27, 2008

(30) Foreign Application Priority Data

May 22, 2007    (TW) .............................. 96118160 A

(51) Int. Cl.
*G06K 9/40*    (2006.01)
(52) U.S. Cl. ........................ 382/260; 382/199
(58) Field of Classification Search .................. 382/199, 382/205, 232, 260, 263, 275; 348/607, 625
See application file for complete search history.

(56) References Cited

U.S. PATENT DOCUMENTS

| | | | |
|---|---|---|---|
| 5,844,614 A * | 12/1998 | Chong et al. | 375/240.24 |
| 5,920,356 A * | 7/1999 | Gupta et al. | 348/606 |
| 6,611,295 B1 | 8/2003 | Drouot et al. | |

* cited by examiner

*Primary Examiner* — Phuoc Tran
(74) *Attorney, Agent, or Firm* — Bacon & Thomas, PLLC

(57) ABSTRACT

A detecting system and method of compression-related noise levels is provided to produce a compressed index of an image. A line buffer temporarily stores a pixel (i, j) and neighboring pixels. An edge filter calculates an edge index for the pixel (i, j). A line filter calculates a line index for the pixel (i, j). A first determination device produces an edge signal according to the edge index and the line index for indicating whether the pixel (i, j) locates at an edge. A first buffer temporarily stores edge signals of the pixel (i, j) and left and right pixels. A second buffer temporarily stores line indexes of the pixel (i, j) and associated pixels. A second determination device produces a ringing signal for the pixel (i, j) according to the edge signals temporarily stored in the first buffer and the line indexes temporarily stored in the second buffer.

20 Claims, 5 Drawing Sheets

| edge_signal (i+3,j) | edge_signal (i+2,j) | edge_signal (i+1,j) | edge_signal (i,j) | edge_signal (i-1,j) | edge_signal (i-2,j) | edge_signal (i-3,j) |
|---|---|---|---|---|---|---|

| line_index (i+3,j) | line_index (i+2,j) | line_index (i+1,j) | line_index (i,j) |
|---|---|---|---|

DETECTING METHOD AND SYSTEM OF COMPRESSION-RELATED NOISE LEVELS

BACKGROUND OF THE INVENTION

1. Field of the Invention

The present invention relates to a technical field of image processing and, more particularly, to a detecting system and method of compression-related noise levels.

2. Description of Related Art

With the advance of digital compression technologies, more and more current TV images are digitally compressed before storage or transmission, and decompressed before play. Such a way can increase the capacity of transmission data and reduce the analog noises. A typical digital compression is an MPEG compression. For the reconstructed images that are distorted after the MPEG compression, some digital defects become obvious when the compression rate is high. In addition, due to the different quantitative levels in compression, certain noises may be produced. For example, when a high quantification is applied to a block-based compression, the boundaries between the blocks may present discontinuous, and the blocking artifacts may be produced on a display image.

To overcome the aforementioned problem, a post-processing technique such as de-blocking or de-ringing at the decompression side is typically applied. Such a post-processing basically assumes that the boundaries between the blocks are known. Accordingly, the correlation parameters obtained by analyzing a compressed image are used to detect the possible blocking artifacts for further performing the post-processing in different levels respectively. In the U.S. Pat. No. 6,611,295, it discloses an MPEG block detection that is applied at the display side, without needing the information at the decompression side. At first, the brightness gradient information of an image is found. Next, the block locations possibly presented are analyzed and counted. Thus, the boundary locations of the original compressed blocks are detected. However, when the compression rate is increased to thus reduce the image quality, the edges with higher image space frequencies typically present ringing. Blocking presents when a wide range of motion occurs. Generally, only analyzing the image content, without using the compression-related data, is hard to properly separate the compressed noises from the original images completely. For producing a preferred estimation index, a span of measure is used in reference to a coincidence of the degree of compressing a same signal source. However, since blocking presents only when the wide range of motion occurs, the noises caused by compressing the images are easily underestimated for a less motion scene.

Therefore, it is desirable to provide an improved detecting method and system to mitigate and/or obviate the aforementioned problems.

SUMMARY OF THE INVENTION

The object of the present invention is to provide a detecting method and system of compression-related noise levels, which focuses on the different images to provide a better detection of compression-related noise levels.

According to a feature of the invention, a detecting system of compression-related noise levels is provided, which produces a compressed index of an image consisting of a two-dimensional array of pixels, where pixel (i, j) indicates an i-column and j-row pixel of the image. The detecting system includes a line buffer, an edge filter, a line filter, a first determination device, a first buffer, a second buffer and a second determination device. The line buffer temporarily stores the pixel (i, j) and neighboring pixels. The edge filter is connected to the line buffer in order to calculate an edge index for the pixel (i, j). The line filter is connected to the line buffer in order to calculate a line index for the pixel (i, j). The first determination device is connected to the edge filter and the line filter in order to produce an edge signal according to the edge index and the line index for indicating whether the pixel (i, j) locates at an edge. The first buffer is connected to the first determination device in order to temporarily store edge signals of the pixel (i, j) and left and right pixels. The second buffer is connected to the line filter in order to temporarily store line indexes of the pixel (i, j) and associated pixels. The second determination device is connected to the first buffer and the second buffer in order to produce a ringing signal for the pixel (i, j) according to the edge signals temporarily stored in the first buffer and the line indexes temporarily stored in the second buffer.

According to another feature of the invention, a detecting method of compression-related noise levels is provided, which produces a compressed index of an image consisting of a two-dimensional array of pixels, where pixel (i, j) indicates an i-row and j-column pixel of the image. The detecting method includes: a first buffering step, which temporarily stores the pixel (i, j) and neighboring pixels; an edge filtering step, which calculates an edge index for the pixel (i, j); a line filtering step, which calculates a line index for the pixel (i, j); a first determining step, which produces an edge signal according to the edge index and the line index for indicating whether the pixel (i, j) locates at an edge; a second buffering step, which temporarily stores edge signals of the pixel (i, j) and left and right pixels; a third buffering step, which temporarily stores line indexes of the pixel (i, j) and associated pixels; and a second determining step, which produces a ringing signal for the pixel (i, j) according to the edge signals temporarily stored in the first buffer and the line indexes temporarily stored in the second buffer.

Other objects, advantages, and novel features of the invention will become more apparent from the following detailed description when taken in conjunction with the accompanying drawings.

BRIEF DESCRIPTION OF THE DRAWINGS

FIG. 6 is a schematic diagram of edge signals of a pixel (i, j) and left and right pixels temporarily stored in a first buffer according to the invention;

FIG. 7 is a schematic diagram of line indexes of a pixel (i, j) and associated pixels temporarily stored in a second buffer according to the invention.

DETAILED DESCRIPTION OF THE PREFERRED EMBODIMENT

Figure 1:
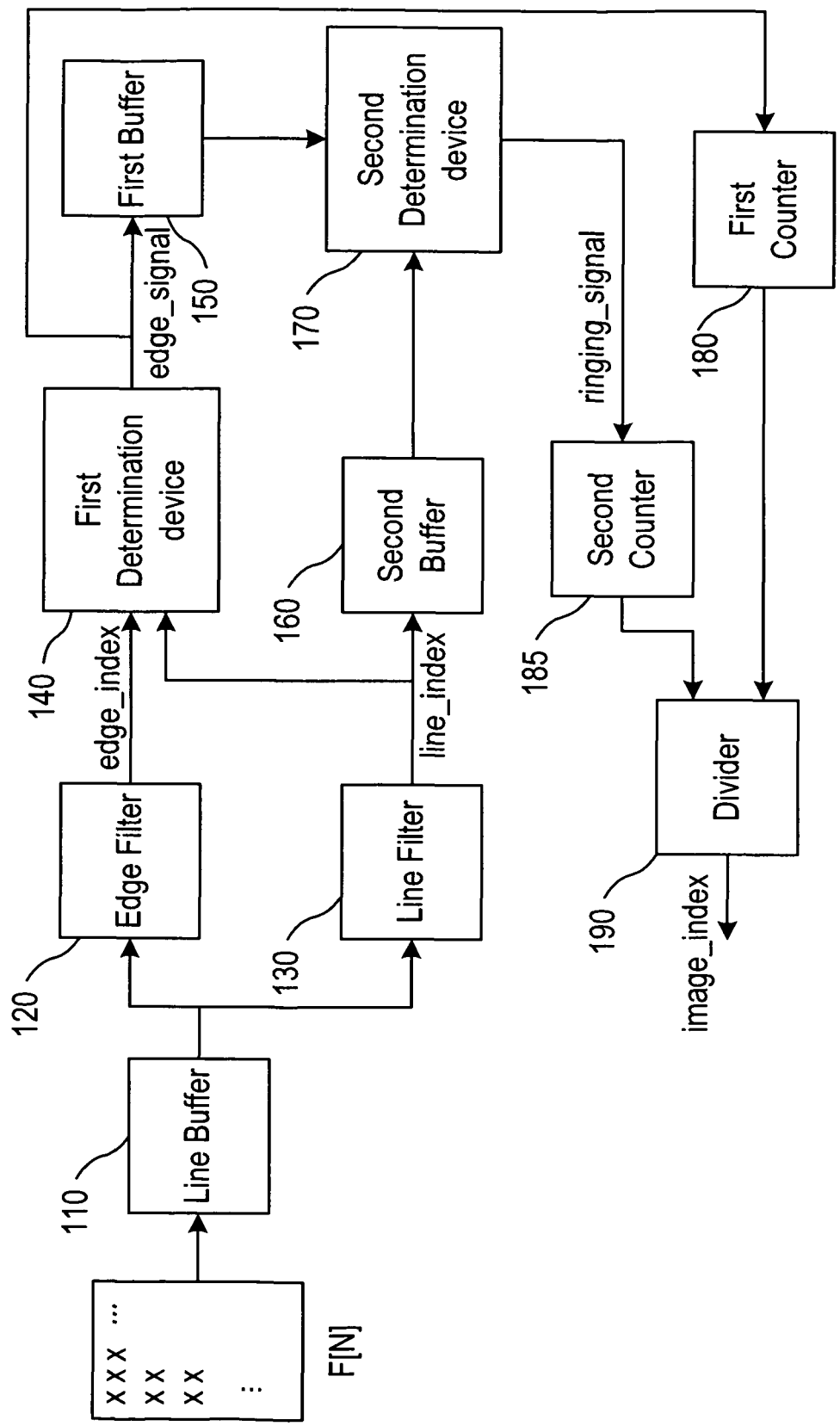
FIG. 1 is a block diagram of a detecting system of compression-related noise levels according to the invention.

FIG. 1 is a block diagram of a detecting system of compression-related noise levels according to the invention. The detecting system can produce a compressed index of an image consisting of a two-dimensional array of pixels, where pixel (i, j) indicates an i-column and j-row pixel of the image. The detecting system includes a line buffer 110, an edge filter 120, a line filter 130, a first determination device 140, a first buffer 150, a second buffer 160, a second determination device 170, a first counter 180, a second counter 185 and a divider 190.

Figure 2:
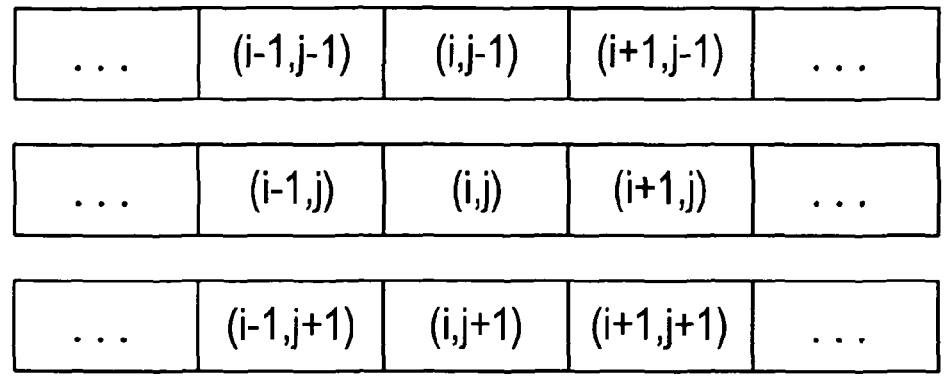
FIG. 2 is a schematic diagram of a line buffer temporarily storing a pixel and neighboring pixels according to the invention.

The line buffer 110 temporarily stores the pixel (i, j) and neighboring pixels. FIG. 2 shows a schematic diagram of the line buffer 110 temporarily storing the pixel (i, j) and neighboring pixels. The neighboring pixels temporarily stored in the line buffer 110 contains the pixels (i−1, j), (i+1, j), (i, j−1), (i−1, j−1), (i+1, j−1), (i, j+1), (i−1, j+1) and (i+1, j+1). The line buffer 110 can use a three-line buffer.

Figure 3:
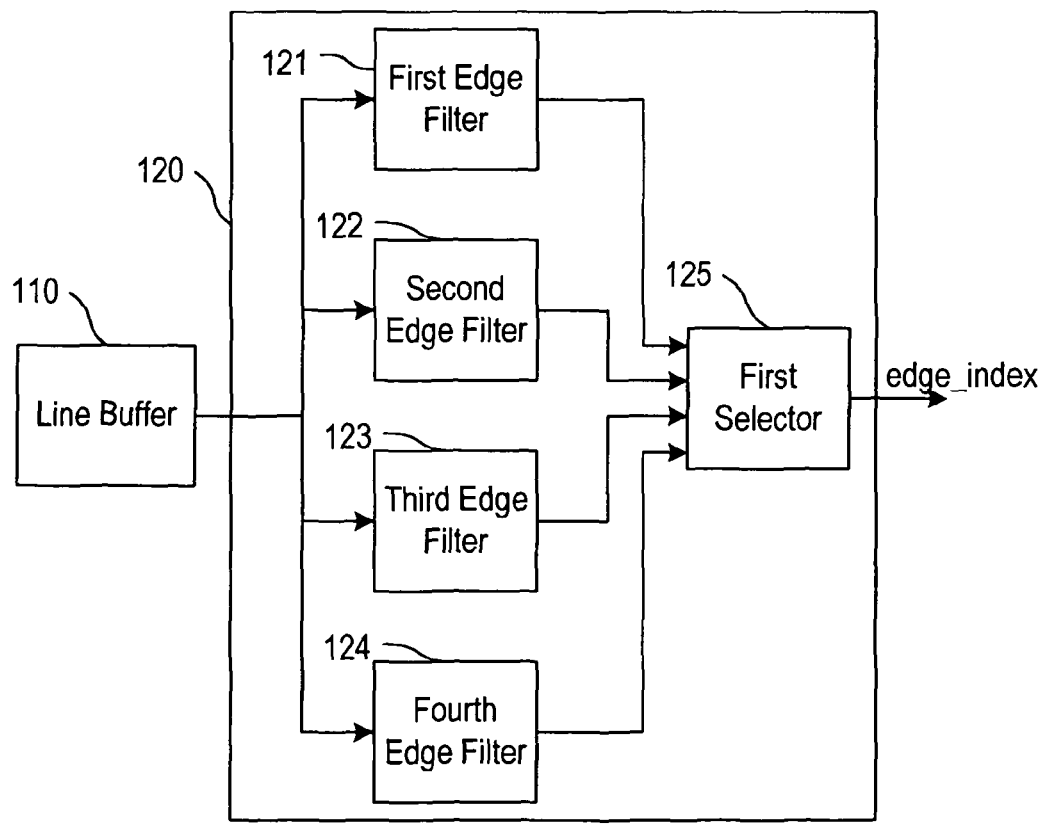
FIG. 3 is a block diagram of an edge filter according to the invention.

The edge filter 120 is connected to the line buffer 110 in order to calculate an edge index edge_index for the pixel (i, j). FIG. 3 shows a block diagram of the edge filter 120. As shown in FIG. 3, the edge filter 120 includes a first edge filter 121, a second edge filter 122, a third edge filter 123, a fourth edge filter 124 and a first selector 125.

The first edge filter 121 is connected to the line buffer 110 in order to perform a filtering on the pixel (i, j) and the neighboring pixels to accordingly produce a first edge value. In this case, the first edge filter 121 has a factor of [−1 0 1; −2 0 2; −1 0 1]. Accordingly, the first edge value is calculated and obtained as (−1)x(i−1, j−1)+0x(i, j−1)+1x(i+1, j−1)+(−2)x(i−1, j)+0x(i, j)+2x(i+1, j)+(−1)x(i−1, j+1)+0x(i, j+1)+1x(i+1, j+1).

The second edge filter 122 is connected to the line buffer 110 in order to perform a filtering on the pixel (i, j) and the neighboring pixels to accordingly produce a second edge value. In this case, the second edge filter 122 has a factor of [−1 −2 −1; 0 0 0; 1 2 1].

The third edge filter 123 is connected to the line buffer 110 in order to perform a filtering on the pixel (i, j) and the neighboring pixels to accordingly produce a third edge value. In this case, the third edge filter 123 has a factor of [2 1 0; 1 0 −1; 0 −1 −2].

The fourth edge filter 124 is connected to the line buffer 110 in order to perform a filtering on the pixel (i, j) and the neighboring pixels to accordingly produce a fourth edge value. In this case, the fourth edge filter 124 has a factor of [0 1 2; −1 0 1; −2 −1 0].

The first selector 125 is connected to the first to fourth edge filters 121-124 in order to select the biggest one among first to fourth edge values as the edge index edge_index.

Figure 4:
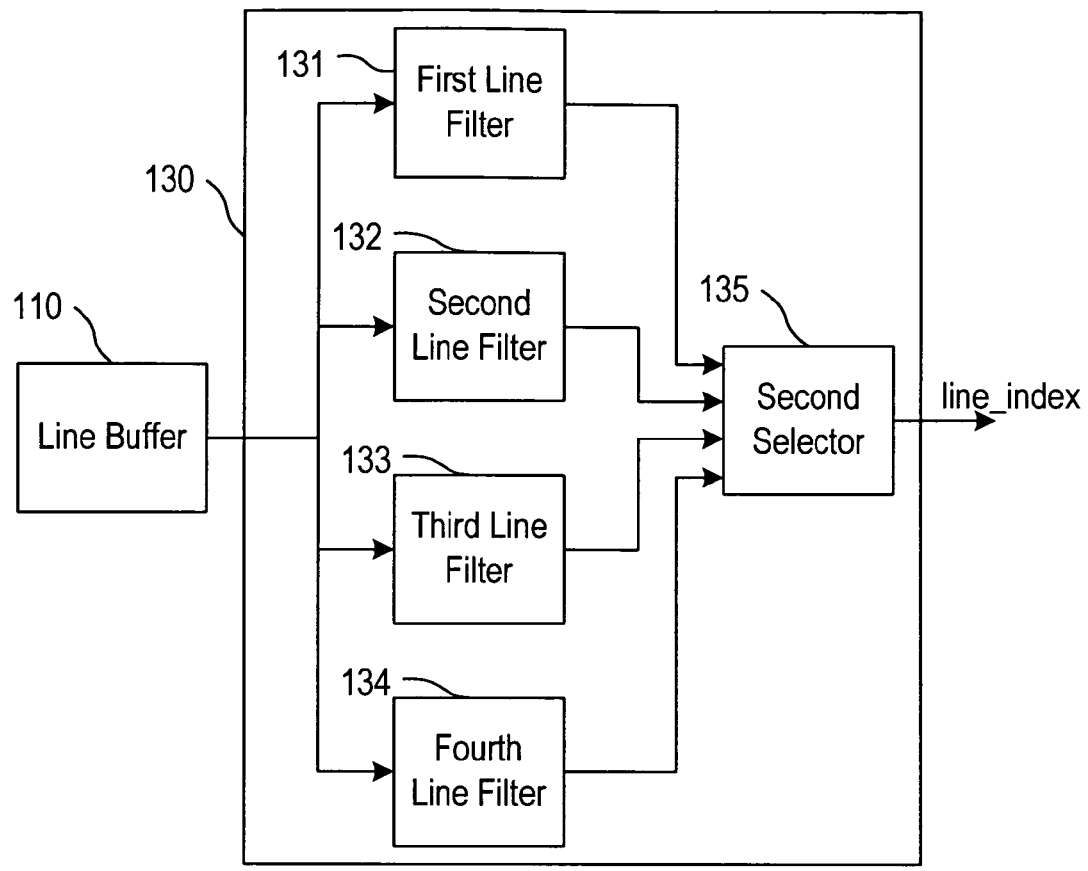
FIG. 4 is a block diagram of a line filter according to the invention.

The line filter 130 is connected to the line buffer 110 in order to calculate a line index line_index for the pixel (i, j). FIG. 4 shows a block diagram of the line filter 130. As shown in FIG. 4, the line filter 130 includes a first line filter 131, a second line filter 132, a third line filter 133, a fourth line filter 134 and a second selector 135.

The first line filter 131 is connected to the line buffer 110 in order to perform a filtering on the pixel (i, j) and the neighboring pixels to accordingly produce a first line value. In this case, the first line filter 131 has a factor of [−1 2 −1; −1 2 −1; −1 2 −1]. Accordingly, the first line value is calculated and obtained as (−1)x(i−1, j−1)+2x(i, j−1)+(−1)x(i+1, j−1)+(−1)x(i−1, j)+2x(i, j)+(−1)x(i+1, j)+(−1)x(i−1,j+1)+2x(i, j+1)+(−1)x(i+1, j+1).

The second line filter 132 is connected to the line buffer 110 in order to perform a filtering on the pixel (i, j) and the neighboring pixels to accordingly produce a second line value. In this case, the second line filter 132 has a factor of [−1 −1 −1; 2 2 2; −1 −1 −1].

The third line filter 133 is connected to the line buffer 110 in order to perform a filtering on the pixel (i, j) and the neighboring pixels to accordingly produce a third line value. In this case, the third line filter 133 has a factor of [−1 −1 2; −1 2 −1; 2 −1 −1].

The fourth line filter 134 is connected to the line buffer 110 in order to perform a filtering on the pixel (i, j) and the neighboring pixels to accordingly produce a fourth line value. In this case, the fourth line filter 134 has a factor of [2 −1 −1; −1 2 −1; −1 −1 2].

The second selector 135 is connected to the first to fourth line filters 131-134 in order to select the biggest one among the first to fourth line values as the line index line_index.

The first determination device 140 is connected to the edge filter 120 and the line filter 130 in order to produce an edge signal edge_signal according to the edge index edge_index and the line index line_index for indicating whether the pixel (i, j) locates at an edge.

Figure 5:
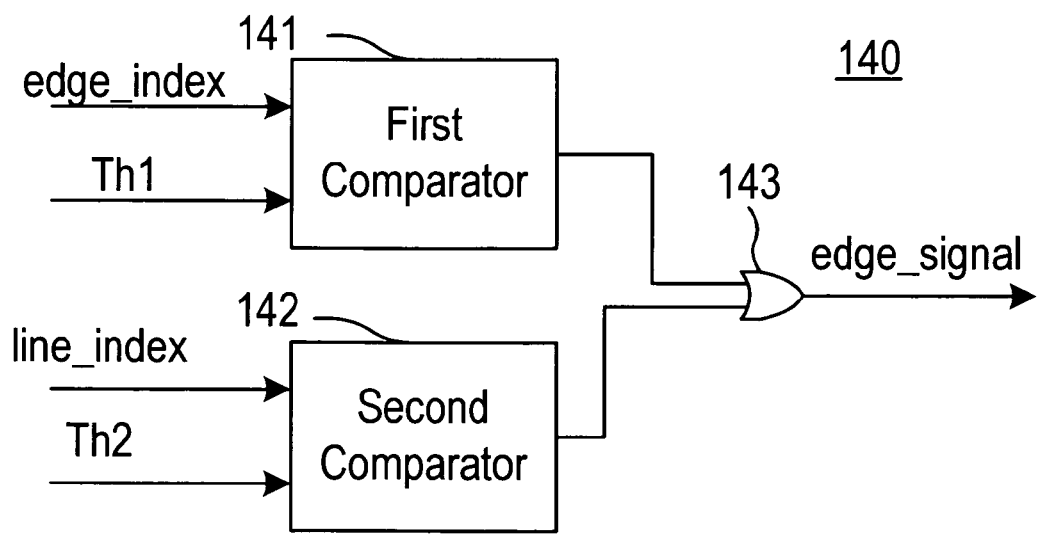
FIG. 5 is a block diagram of a first determination device according to the invention.

FIG. 5 shows a block diagram of the first determination device 140. In FIG. 5, the first determination device 140 includes a first comparator 141, a second comparator 142 and an OR gate 143. As shown in FIG. 5, the first comparator 141 is connected to the edge filter 120. When the edge index edge_index of the pixel (i, j) is greater than a first threshold Th1, a first comparator output signal is produced. In this embodiment, the first threshold Th1 is preferably a sixteenth of the numerical domain of the edge index edge_index. For example, when the edge index edge_index is represented by eight bits, the first threshold Th1 is preferably a value of 16(=256/16). When the edge index edge_index is represented by nine bits, the first threshold Th1 is preferably a value of 32(=512/16).

The second comparator 142 is connected to the line filter 130. When the line index line_index of the pixel (i, j) is greater than a second threshold Th2, a second comparator output signal is produced. In this embodiment, the second threshold Th2 is preferably a sixteenth of the numerical domain of the line index line_index. For example, when the line index line_index is represented by eight bits, the second threshold Th2 is preferably a value of 16(=256/16). When the line index line_index is represented by nine bits, the second threshold Th2 is preferably a value of 32(=512/16).

The OR gate 143 has an input terminal connected to the first comparator 141 and the second comparator 142 in order to perform an OR operation on the first and second comparator output signals to thereby produce the edge signal edge_signal. When the edge signal edge_signal is at a high voltage (1), it indicates that the pixel (i, j) locates at an edge. When the edge signal edge_signal is at a low voltage (0), it indicates that the pixel (i, j) does not locate at the edge.

The first buffer 150 is connected to the first determination device 140 in order to temporarily store edge signals of the pixel (i, j) and left and right pixels. FIG. 6 is a schematic diagram of edge signals of a pixel (i, j) and left and right pixels temporarily stored in the first buffer 150. As shown in FIG. 5, the left and right pixels in this case contain the pixels (i−3, j), (i−2, j), (i−1, j), (i+1, j), (i+2, j), (i+3, j), and the edge signals of the left and right pixels are edge_signal(i−3, j), edge_signal (i−2, j), edge_signal(i−1, j), edge_signal(i+1, j), edge_signal (i+2, j), edge_signal(i+3, j), respectively.

The second buffer 160 is connected to the line filter 130 in order to temporarily store line indexes of the pixel (i, j) and associated pixels. FIG. 7 is a schematic diagram of line indexes of the pixel (i, j) and the associated pixels temporarily stored in the second buffer 160. As shown in FIG. 7, the associated pixels in this case contain the pixels (i+1, j), (i+2, j), (i+3, j), and the line indexes are line_index(i+1, j), line_index(i+2, j), line_index(i+3, j), respectively.

The second determination device 170 is connected to the first buffer 150 and the second buffer 160 in order to produce a ringing signal ringing_signal for the pixel (i, j) according to the edge signals temporarily stored in the first buffer and the line indexes temporarily stored in the second buffer.

Figure 8:
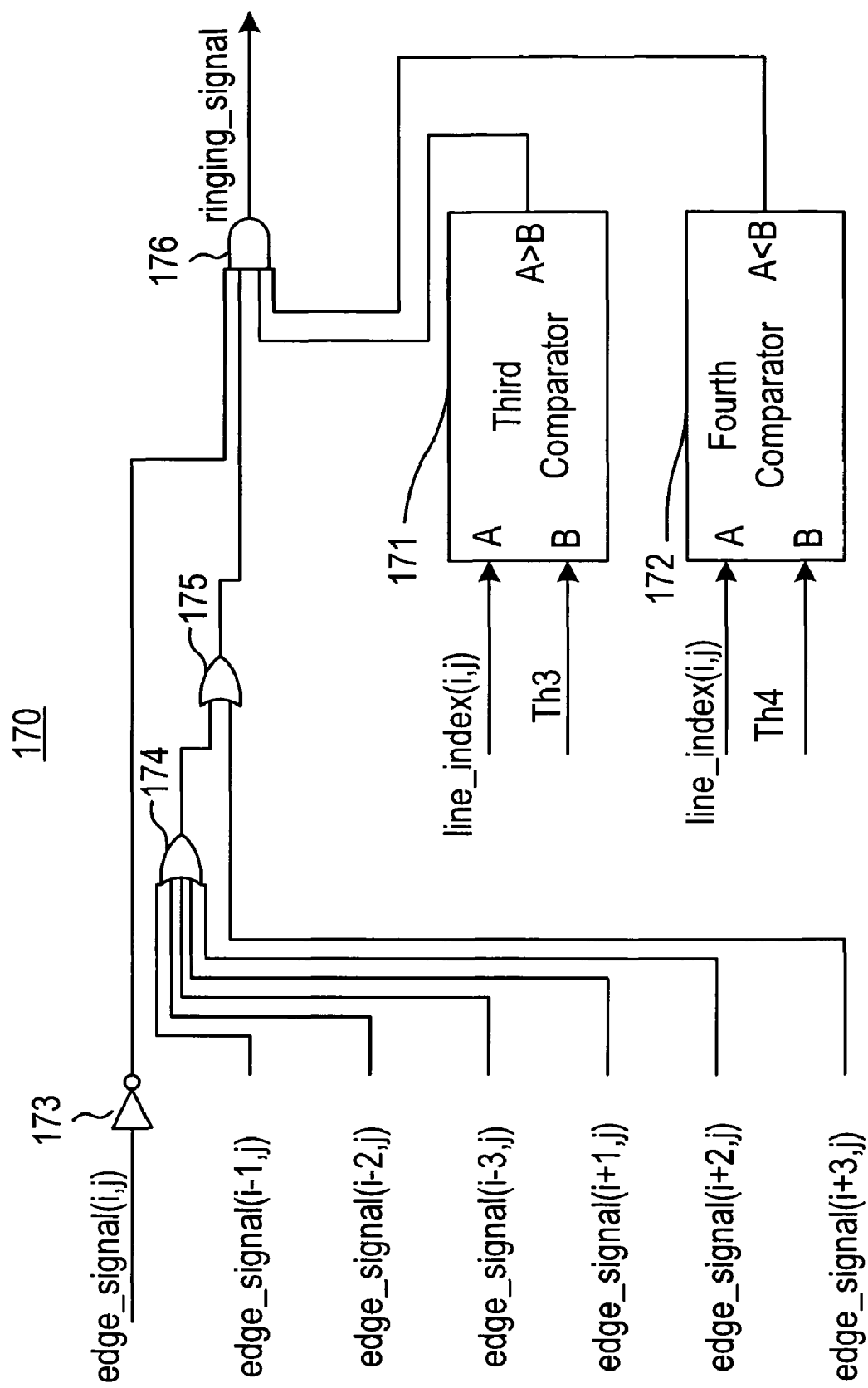
FIG. 8 is a block diagram of a second determination device according to the invention.

FIG. 8 is a block diagram of the second determination device 170 according to the invention. As shown in FIG. 8, the second determination device 170 includes a third comparator 171, a fourth comparator 172, a phase-inverted gate 173, a five-input OR gate 174, a two-input OR gate 175 and a four-input AND gate 176. When the pixel (i, j) does not locate at the edge, one of the pixels (i−3, j), (i−2, j), (i−1, j), (i+1, j), (i+2, j), (i+3, j) locates at the edge, and the line index line_index(i, j) of the pixel (i, j) is greater than a third threshold Th3 and smaller than a fourth threshold Th4, the second determination device 170 produces the ringing signal ringing_signal for the pixel (i, j).

The first counter 180 is connected to the first determination device 140 in order to use the edge signal edge_signal as a trigger signal for counting the number of pixels locating at the edge. The second counter 185 is connected to the second determination device 170 in order to use the ringing signal ringing_signal as a trigger signal for counting the number of pixels that are of ringing in the image. The divider 190 is connected to the first counter 180 and the second counter 185 in order to divide an output of the second counter 185 by an output of the first counter 180 to thereby obtain the compressed index image_index of the image.

As cited, the invention can use the index image_index to find the compressed degree of the image. The number of pixels at the edge and the number of pixels with ringing in a picture are calculated respectively. When the number of pixels with ringing has a high percentage of the number of pixels at the edge, it indicates that the level of noises caused by compressing the video or image is high, and the higher the percentage is, the higher the level of noises is.

The invention detects the ringing effect in a decompressed image that is caused by a higher compression rate for further post-processing. The different-level post-processing can be applied to the images with the different-level distortion according to the index image_index detected, thereby obtaining a better display quality. Since the invention only uses the decompressed image in detection, no compressed information and no transformation are required. Therefore, the invention can be easily applied to a typical TV display system.

Although the present invention has been explained in relation to its preferred embodiment, it is to be understood that many other possible modifications and variations can be made without departing from the spirit and scope of the invention as hereinafter claimed.

What is claimed is:

1. A detecting system of compression-related noise levels, which produces a compressed index of an image consisting of a two-dimensional array of pixels, where pixel (i, j) indicates an i-column and j-row pixel of the image, the detecting system comprising:
a line buffer, which temporarily stores the pixel (i, j) and neighboring pixels;
an edge filter, which is connected to the line buffer in order to calculate an edge index for the pixel (i, j);
a line filter, which is connected to the line buffer in order to calculate a line index for the pixel (i, j);
a first determination device, which is connected to the edge filter and the line filter in order to produce an edge signal for indicating whether the pixel (i, j) locates at an edge;
a first buffer, which is connected to the first determination device in order to temporarily store edge signals of the pixel (i, j) and left and right pixels;
a second buffer, which is connected to the line filter in order to temporarily store line indexes of the pixel (i, j) and associated pixels; and
a second determination device, which is connected to the first buffer and the second buffer in order to produce a ringing signal for the pixel (i, j) according to the edge signals temporarily stored in the first buffer and the line indexes temporarily stored in the second buffer.

2. The detecting system as claimed in claim 1, further comprising:
a first counter, which is connected to the first determination device in order to calculate the number of pixels locating at the edge in the image according to the edge signal;
a second counter, which is connected to the second determination device in order to use the ringing signal for calculating the number of pixels with ringing in the image; and
a divider, which is connected to the first counter and the second counter in order to calculate the compressed index of the image.

3. The detecting system as claimed in claim 2, wherein the neighboring pixels temporarily stored in the line buffer are pixels (i−1,j), (i+1,j), (i,j−1), (i−1,j−1), (i+1,j−1), (i,j+1), (i−1,j+1) and (i+1,j+1).

4. The detecting system as claimed in claim 3, wherein the edge filter comprises:
a first edge filter, which is connected to the line buffer in order to perform a filtering on the pixel (i, j) and the neighboring pixels to accordingly produce a first edge value;
a second edge filter, which is connected to the line buffer in order to perform a filtering on the pixel (i, j) and the neighboring pixels to accordingly produce a second edge value;
a third edge filter, which is connected to the line buffer in order to perform a filtering on the pixel (i, j) and the neighboring pixels to accordingly produce a third edge value;
a fourth edge filter, which is connected to the line buffer in order to perform a filtering on the pixel (i, j) and the neighboring pixels to accordingly produce a fourth edge value; and
a first selector, which is connected to the first to fourth edge filters in order to select the biggest one among the first to fourth edge values as the edge index.

5. The detecting system as claimed in claim 3, wherein the line filter comprises:
a first line filter, which is connected to the line buffer in order to perform a filtering on the pixel (i, j) and the neighboring pixels to accordingly produce a first line value;
a second line filter, which is connected to the line buffer in order to perform a filtering on the pixel (i, j) and the neighboring pixels to accordingly produce a second line value;
a third line filter, which is connected to the line buffer in order to perform a filtering on the pixel (i, j) and the neighboring pixels to accordingly produce a third line value;
a fourth line filter, which is connected to the line buffer in order to perform a filtering on the pixel (i, j) and the neighboring pixels to accordingly produce a fourth line value; and a second selector, which is connected to the first to fourth line filters in order to select the biggest one among the first to fourth line values as the line index.

6. The detecting system as claimed in claim 1, wherein the first determination device comprises:
   a first comparator, which is connected to the edge filter in order to produce a first comparator output signal when the edge index of the pixel (i, j) is greater than a first threshold in comparison;
   a second comparator, which is connected to the line filter in order to produce a second comparator output signal when the line index of the pixel (i, j) is greater than a second threshold in comparison; and
   an OR gate, which is connected to the first comparator and the second comparator in order to thereby produce the edge signal.

7. The detecting system as claimed in claim 6, wherein the edge signals of the left and right pixels temporarily stored in the first buffer are the edge signals of pixels (i−3,j), (i−2,j), (i−1,j), (i+1,j), (i+2,j) and (i+3,j).

8. The detecting system as claimed in claim 7, wherein the line indexes of the associated pixels temporarily stored in the second buffer are the lien indexes of pixels (i+1,j), (i+2,j) and (i+3,j).

9. The detecting system as claimed in claim 8, wherein the pixel (i, j) locates at the edge when the edge signal is at a high voltage.

10. The detecting system as claimed in claim 8, wherein the second determination device produces the ringing signal for the pixel (i, j) when the pixel (i, j) does not locate at the edge, one of the pixels (i−3,j), (i−2,j), (i−1,j), (i+1,j), (i+2,j), (i+3,j) locates at the edge, and the line index of the pixel (i, j) is greater than a third threshold and smaller than a fourth threshold.

11. The detecting system as claimed in claim 2, wherein the divider divides an output of the second counter by an output of the first counter to thereby produce the compressed index of the image.

12. A detecting method of compression-related noise levels, which produces a compressed index of an image consisting of a two-dimensional array of pixels, where pixel (i, j) indicates an i-column and j-row pixel of the image, the detecting method comprising:
   a first buffering step, which temporarily stores the pixel (i, j) and neighboring pixels;
   an edge filtering step, which calculates an edge index for the pixel (i, j);
   a line filtering step, which calculates a line index for the pixel (i, j);
   a first determining step, which produces an edge signal according to the edge index and the line index for indicating whether the pixel (i, j) locates at an edge;
   a second buffering step, which temporarily stores edge signals of the pixel (i, j) and left and right pixels;
   a third buffering step, which temporarily stores line indexes of the pixel (i, j) and associated pixels;
   a second determining step, which produces a ringing signal for the pixel (i, j) according to the edge signals temporarily stored in the first buffer and the line indexes temporarily stored in the second buffer.

13. The detecting method as claimed in claim 12, further comprising:
   a first counting step, which calculates the number of pixels locating at the edge in the image according to the edge signal;
   a second counting step, which calculates the number of pixels with ringing in the image according to the ringing signal; and
   a dividing step, which calculates the compressed index of the image according to the first counter and the second counter.

14. The detecting method as claimed in claim 13, wherein the neighboring pixels in the first buffering step are pixels (i−1,j), (i+1,j), (i,j−1), (i−1,j−1), (i+1,j−1), (i,j+1), (i−1,j+1) and (i+1,j+1).

15. The detecting method as claimed in claim 14, wherein the edge filtering step comprises:
   a first edge filtering step, for filtering on the pixel (i, j) and the neighboring pixels to accordingly produce a first edge value;
   a second edge filtering step, for filtering on the pixel (i, j) and the neighboring pixels to accordingly produce a second edge value;
   a third edge filtering step, for filtering on the pixel (i, j) and the neighboring pixels to accordingly produce a third edge value;
   a fourth edge filtering step, for filtering on the pixel (i, j) and the neighboring pixels to accordingly produce a fourth edge value; and
   a first selecting step, which selects the biggest one among the first to fourth edge values as the edge index.

16. The detecting method as claimed in claim 15, wherein the line filtering step comprises:
   a first line filtering step, for filtering on the pixel (i, j) and the neighboring pixels to accordingly produce a first line value;
   a second line filtering step, for filtering on the pixel (i, j) and the neighboring pixels to accordingly produce a second line value;
   a third line filtering step, for filtering on the pixel (i, j) and the neighboring pixels to accordingly produce a third line value;
   a fourth line filtering step, for filtering on the pixel (i, j) and the neighboring pixels to accordingly produce a fourth line value; and
   a second selecting step, which selects the biggest one among the first to fourth line values as the line index.

17. The detecting method as claimed in claim 16, wherein the first determining step comprises:
   a first comparing step, which produces a first comparator output signal when the edge index of the pixel (i, j) is greater than a first threshold in comparison;
   a second comparing step, which produces a second comparator output signal when the line index of the pixel (i, j) is greater than a second threshold in comparison; and
   an OR operation step, which performs an OR operation on the first and second comparator output signals to thereby produce the edge signal.

18. The detecting method as claimed in claim 17, wherein the edge signals of the left and right pixels in the second buffering step are the edge signals of pixels (i−3,j), (i−2,j), (i−1,j), (i+1,j), (i+2,j) and (i+3,j).

19. The detecting method as claimed in claim 18, wherein the line indexes of the associated pixels in the third buffering step are the lien indexes of pixels (i+1,j), (i+2,j) and (i+3,j).

20. The detecting method as claimed in claim 19, wherein the pixel (i, j) locates at the edge when the edge signal is at a high voltage, and the second determining step produces the ringing signal for the pixel (i, j) when the pixel (i, j) does not locate at the edge, one of the pixels (i−3,j), (i−2,j), (i−1,j), (i+1,j), (i+2,j), (i+3,j) locates at the edge, and the line index of the pixel (i, j) is greater than a third threshold and smaller than a fourth threshold.

* * * * *